March 17, 1925.
A. B. BAUST
BRAKE
Filed March 27, 1924
1,529,862
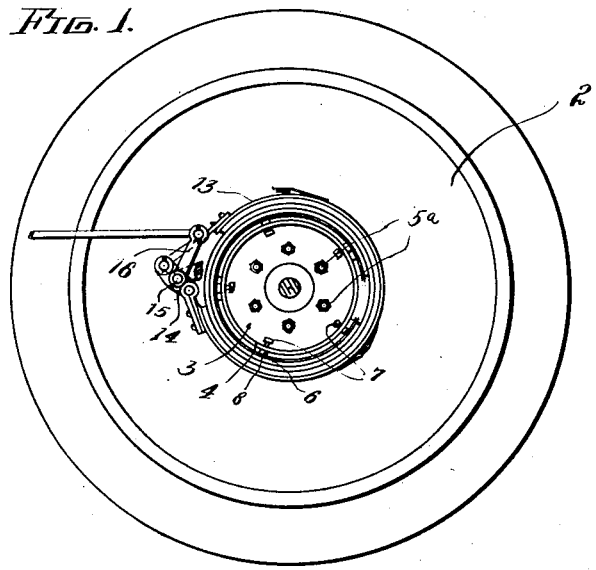
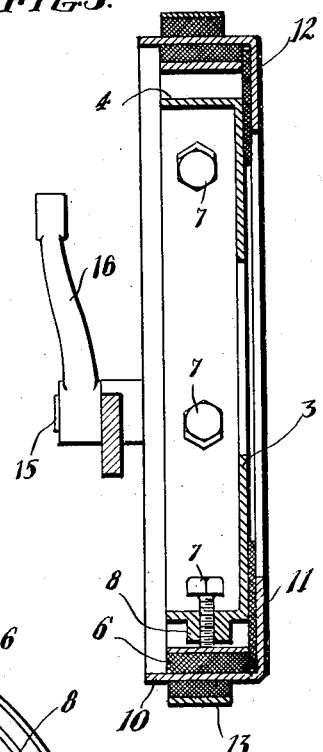
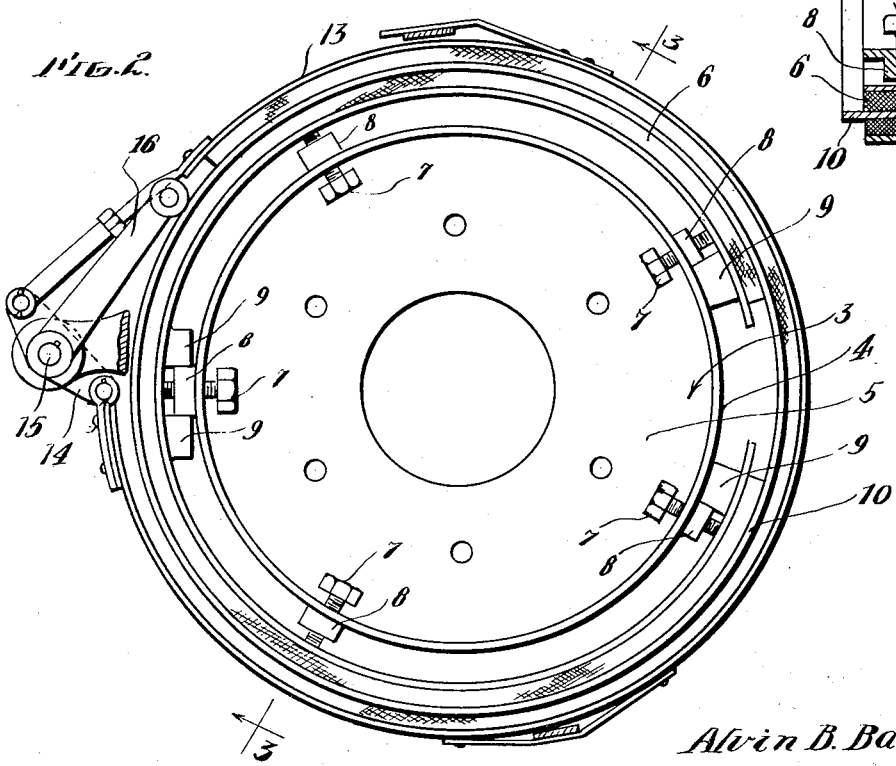
Inventor
Alvin B. Baust
By Lyon & Lyon
Attorneys Patented Mar. 17, 1925.

1,529,862

UNITED STATES PATENT OFFICE.

ALVIN B. BAUST, OF WHITTIER, CALIFORNIA.

BRAKE.

Application filed March 27, 1924. Serial No. 702,257.

*To all whom it may concern:*

Be it known that I, ALVIN B. BAUST, a citizen of the United States, residing at Whittier, in the county of Los Angeles, State of California, have invented a new and useful Brake, of which the following is a specification.

This invention relates to brakes and particularly refers to the type of brakes which are employed upon a vehicle such as an automobile and attached to the wheels thereof for braking the speed of the vehicle.

An object of the present invention is to provide a brake with a means for eliminating or preventing the brake locking the wheel or driven member to be controlled by the brake so that when the brake is employed upon a vehicle such as an automobile the brake cannot lock the wheel and cause the automobile to skid.

Another object of the present invention is to provide a form of brake by which the maximum braking action may be obtained upon a wheel of the vehicle without danger of locking the wheel from rotation when so applying such maximum braking action.

It is a well known fact that in order to most rapidly check the speed of the vehicle, such as an automobile, the brakes employed upon the wheel will be most effective if adjusted to just that braking action which is below the point at which the wheel will be locked or caused to skid upon the roadway. If the brake is applied with such force as to pass such point and cause the vehicle to skid the vehicle will be substantially less rapidly checked in its progress. Frequently accidents have resulted with the ordinary type of brake by the driver slamming on the brakes in a time of emergency so that the brakes grip the wheel with a force beyond which the roadway will prevent the wheel locking in operation.

I have provided in the present invention a form of brake in which this effect is impossible.

Various other objects and advantages of the invention will be apparent from a description of the preferred embodiment of the invention for which purpose reference is made to the accompanying drawings forming a part of the disclosure of the invention in which—

Figure 1 is an elevation of a vehicle wheel provided with a brake embodying the invention.

Fig. 2 is an enlarged elevation of the brake; and

Fig. 3 is a section on the line 3—3 of Fig. 2.

Referring to the drawings, I have shown the invention as it is applied to a disc wheel 2 of a vehicle, the wheel 2 carrying a driven member 3 which is provided with a drum portion 4 concentric with the axis of the wheel and a disc-shaped flange 5 inturned from one of the marginal edges of the drum 4, the driven member 3 being bolted or riveted to the wheel 2 by bolts or rivets 5ª. It is understood, however, that the driven member 3 may, if desired, constitute an integral part of the wheel and will be substantially modified if the brake is employed with other forms of wheels such as the well-known wooden spoke type.

10 indicates a drum concentric with the axis of the wheel and provided with an inturned disc flange 11 which in use engages a disc washer or plate 12 which is interposed between the flange 11 of the drum 10 and the flange 5 of the driven member 3. The driven member 3 carries means operative to frictionally engage the inside of the drum 10 and operative to normally cause such drum to be driven or carried with the driven member. Such means comprise an expanding brakeband 6 engaged on its inner side by a plurality of pressure adjusting members 7 in the form of bolts which are threaded through bosses 8 on the drum 4 of the driven member 3 and can be radially adjusted by a wrench engaging their heads to press the expanding brakeband 6 against the drum 10 with various desired pressures. Stops 9 are carried by the brakeband 6 and extend between the band 6 and driven member 3 into engagement with the bosses 8 on such driven member to insure that the expanding brakeband 6 cannot rotate with respect to the driven member 3.

The brake is provided with means to stop or check the rotation of the brake drum 10 so that the brakeband 6 will become operative to brake the wheel 2 and in such case it will be seen that the wheel 2 will always be checked by a predetermined braking action determined by the adjustments of the pressure adjusting members 7. It is preferable that the means so provided for stopping the brake drum 10 should also be operative to only apply an action tending to frictionally brake the rotation of the drum so that a means is provided for applying various braking actions to the wheel. The preferred form of such means comprises an outer brakeband 13 positioned to engage the outer surface of the brakedrum 10, such brakeband being of any preferred or customary construction and being similar to various types of brakebands now employed for braking the wheels of such vehicles, the band 13 illustrated being provided with connections at its opposed ends to a rocker cam 14 carried by a shaft 15 which shaft also carries an arm or lever 16 to which connection may be made in the case of a vehicle with the customary foot brake pedal or hand brake lever in any preferred manner, the cam 14 being operative by such means to tighten or release the band 13 upon the brakedrum 10 to apply various amounts of braking action to the drum and operative under sufficient pressure to entirely stop the drum 10 prior to the stopping of the wheel 2 and cause the further braking action of the brake to take place between the drum 10 and inner expanding brakeband 6.

It will be apparent that the bolts or pressure adjusting member 7 may be adjusted to press in and expand the brakeband 6 against the brake drum 10 with any desired pressure and that by proper regulation such pressure may be that which will give the maximum braking action to the wheel 2 of the vehicle that can be permitted to be applied to such wheel without causing the wheel to skid and that the brake, when so constructed, will prevent the wheels skidding since even when the outer brakehead 13 is applied with such pressure as to cause a positive stopping of the drum 10 the friction engagement between the drum 10 and the inner brakeband 6 will yield to prevent locking of the brake.

It is thus seen that I have provided a form of brake which provides additional safety to drivers of such vehicles. The brake will be found to be of special value when employing the present developed four-wheel braking systems for automobiles and as applied to the front wheels of such four-wheel braking system, or other braking system where the front wheels are braked, it being especially necessary to prevent skidding of the front wheels.

While I have shown the invention in its preferred form, it is understood that the embodiment of the invention described herein is only one of the many embodiments this invention may take, and I do not wish to be limited to the particular form of the invention shown herein, and the invention is of the scope set forth in the appended claims.

I claim:

1. A brake of the class described, the brake comprising a brake drum, a brake band operative to frictionally engage such drum, means for tightening and releasing such band from the drum, and a driven member carrying means frictionally engaging the drum to normally drive such drum with the driven member, such means being operative to yield to prevent locking of the brake.

2. A brake of the class described, the brake comprising a driven member, a brake drum normally carried by the driven member, means for tightening a brake band to such drum and releasing the drum from the band, and means to automatically release the drum from the driven member to prevent locking of the brake.

3. In a brake of the class described, the combination of a brake drum, a brake band frictionally engaging the drum, a rotatably driven member carrying such band, means for locking the band pressed against the drum at various desired pressures, a second brake band, and means operative to tighten the second band to and release the second band from the drum.

4. In a brake of the class described, the combination of a brake drum, an expanding brake band engaging the drum, a contracting brake band engaging the drum, means for locking one of the bands in frictional engagement with the drum, a rotatably driven member carrying such last mentioned band, and means operative to variably apply the other band to check the drum.

5. In a brake of the class described, the combination of a brake drum, a driven member carrying means frictionally engaging the drum to normally drive such drum with the driven member, such means being automatically operative on stopping of the drum to apply a constant braking action on the driven member, and means operative to stop such drum.

6. In a brake of the class described, the combination of a brake drum, a brake band operative to frictionally engage such drum, means for tightening and releasing the band, a driven member carrying means frictionally engaging the drum to normally carry the drum with the driven member, such means being operative to yield to prevent locking of the brake, and means to prevent axial movement between the driven member and drum.

7. In a brake of the class described, the combination of a brake drum, means for frictionally engaging the drum, means operative at will to control said first-mentioned means, a driven member, and a removable friction member carried by such driven member operative to normally carry the drum with such driven member and to release it to prevent locking of the brake.

Signed at Los Angeles, California, this 21st day of March, 1924.

ALVIN B. BAUST.